United States Patent

Barthel

[15] 3,653,534

[45] Apr. 4, 1972

[54] SPHERE-O-RING GAS-TIGHT SEAL ASSEMBLY

[72] Inventor: Alfred Barthel, Indianapolis, Ind.

[73] Assignee: Union Carbide Corporation, New York, N.Y.

[22] Filed: Mar. 2, 1970

[21] Appl. No.: 15,484

[52] U.S. Cl. .......................................................220/46 R
[51] Int. Cl. .......................................................B65d 53/00
[58] Field of Search ..................220/44 R, 44 A; 137/43, 46; 215/60

[56] References Cited

UNITED STATES PATENTS 3,465,911  9/1969  Colarusso et al. .....................220/44 B

*Primary Examiner*—George T. Hall
*Attorney*—Paul A. Rose, Thomas I. O'Brien, Harrie M. Humphreys and John C. Le Fever

[57] ABSTRACT

A gas-tight seal assembly, a preferred form of which comprises a rigid tube with a rigid sphere lodged therein between a rigid annular seat which is part of the inner wall of said tube on the low pressure side of said ball, and a resilient, elastic seat on the high pressure side of said ball, such that a seal is formed between the ball and the resilient elastic seat.

5 Claims, 3 Drawing Figures

PATENTED APR 4 1972          3,653,534

INVENTOR
ALFRED BARTHEL
BY John C. Weaver
ATTORNEY

়
3,653,534

SPHERE-O-RING GAS-TIGHT SEAL ASSEMBLY

BACKGROUND OF INVENTION

Gastight seals and, in particular, vacuum seals have long been required in the manufacture of double-walled cryogenic containers. In such containers an inner vessel is used to store liquid cryogens, while an outer vessel, gas tightly affixed to the inner vessel, is provided such that an evacuable space is formed between the inner and outer vessel. A vacuum, as well as thermal insulation material, and gas adsorbent material are provided in the evacuable space to ensure that the inner cryogen containing vessel receives as little atmospheric heat as possible. A vacuum is drawn in the vacuum space during the final stages of manufacture of these double-walled containers through a tube or spud in the outer container wall which tube is sealed after the vacuum space has been evacuated. Several methods are used to form a vacuum seal. One method employs a vacuum valve, but because of its high cost, bulkiness and the potential of being opened inadvertently after the vacuum is drawn, such vacuum seals are seldom used. Possibly, the best known way of forming a vacuum seal is by using a pinch-off tube made of some metal material, preferably copper. In this case when a desired low pressure is reached in the vacuum space of a double-walled container the copper tube connected to the vacuum pump and the outer vessel of the double-walled container is squeezed with a special tool until the tube is cold-welded and severed. The pinched-off tube portion left on the vessel is flat at the end and has a razor sharp edge where the copper has been severed and cold-welded. The welded edge is thin, dangerous and vulnerable to moderate blows resulting from normal handling. For this reason it is, in most instances, protected with a sturdy cap. In addition, problems encountered when the copper pinch-off tube is welded or brazed to the double-walled container because the container outer vessel is usually made of steel or aluminum which metals are not weldably compatible with copper. Since pure copper is the most desirable metal for the pinch-off tube because of its outstanding cold-welding properties expensive silver brazing must be used in most practical applications to join the copper pinch-off tube to the double-walled container. In this case, the cleaning of flux residues to ensure vacuum integrity is a significant problem. Another problem is encountered after the copper pinch-off tube has been welded or brazed to the double-walled container, that is, the inside of the copper tube must be thoroughly cleaned to remove all oxides which would prevent proper cold-welding. In cases where aluminum vessels are used, the copper tube cannot be used at all due to metallurgical incompatibility. In this case a less desirable aluminum tube is used instead and vacuum integrity of the pinched-off tube is ensured by welding it shut. An improvement over the pinch-off tube concept was the evacuation spud. In this concept a spud, which is a tubular member machined from a metal which is weldable to the double-walled container, was provided with a shoulder from the inner portion of the spud near the vacuum end. That shoulder provided support for an elastomer ring, that is, the shoulder prevented the elastomer ring from passing through the spud and into the vacuum space. After the vacuum space was evacuated a rigid ball was dropped by gravity into the spud and contacted the elastomer ring. As atmospheric pressure was resorted to the spud, the ball was driven against the elastomer ring which in turn was driven against the spud shoulder thereby forming a vacuum seal. Vacuum integrity in these devices depends upon atmospheric pressure and to a certain degree on the skill of the operator at the critical moment when the rigid ball is once more exposed to atmospheric pressure. A permanent seal is provided by filling the spud cavity with epoxy. If epoxy is not used, then the integrity of the seal is jeopardized by vibrations normally encountered in shipping and in use. Such vibrations tended to cause the rigid ball to rise from and fall against the elastomer ring thereby making gas leakage possible. The evacuation spud gas passage is not efficient in low pressure gas conductance because the ratio of the rigid sphere diameter to the orifice diameter formed by the spud shoulder is poor owing to the need for a rather large shoulder to retain the elastomer ring.

When a double-walled container loses vacuum in the vacuum space, it is generally desirable to automatically equalize the vacuum space pressure with atmospheric pressure to avoid potential damage to the double-walled container such as by an overpressure resulting from a leak in the inner vessel. Regarding automatic pressure release, the valve and pinch-off tube are inherently of no value. However, an evacuation spud which is not filled with epoxy may operate as a pressure release device. In general however, the susceptibility of a non-epoxy filled evacuation spud to gas leakage due to vibration makes evacuation spuds undesirable as automatic pressure release devices.

OBJECTS

An object of this invention is to provide a gas-tight seal assembly which is compatible with the material of double-walled containers to which the device is welded while at the same time is free from dependency on operator experience for proper installation, which provides a reliable seal with or without the use of epoxy, and which seal is not adversely affected by vibration.

Another object of this invention is to provide a vacuum closure assembly which can operate as an automatic pressure release device.

SUMMARY OF INVENTION

The hereinabove and other objects are accomplished by a gastight seal assembly comprising a rigid housing with an inner wall forming a passage therethrough, one end of the passage communicating with an environment of high pressure and the other end of said passage communicating with an environment of low pressure; a rigid restraining means disposed within said passage intermediate said one end and said other end; a groove in the housing inner wall disposed between said restraining member and the passage one end; a resilient, elastic member positioned in said groove and of sufficient size for its entire inner periphery to extend inwardly beyond the housing inner wall into the passage when in an uncompressed state; a rigid closure member having a maximum cross sectional area of less than that bounded by said housing inner wall and such that a gastight seal is formed between said closure member and the resilient elastic member when said closure member is positioned against said restraining means.

The rigid closure member has a shape and size such that its maximum outer periphery in a plane substantially perpendicular to the passage axis lies between the inner periphery of the resilient, elastic member in an uncompressed state and the periphery of the housing innner wall, which rigid closure member is disposed against said restraining means which applies a restraining force to the closure member having at least a component in the direction of said passage one end, and which closure member compressively and gas-tightly contacts said elastic member, and said elastic member applies a force to the closure member having a component in a direction opposite that of said restraining force.

DETAILED DESCRIPTION

Figure 1:
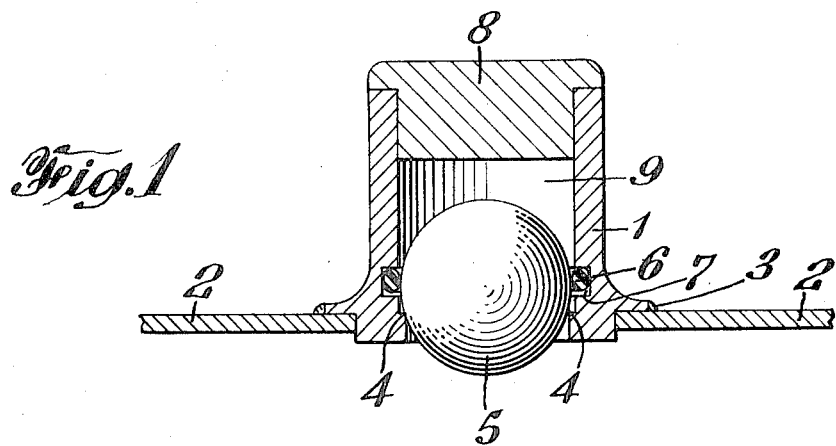
FIG. 1 is a cross sectional view of one embodiment of this invention.

FIG. 1 shows an embodiment of this invention having a tubular housing 1 attached to vessel wall 2 by means of weld 3. Restraining lip 4 is annularly disposed within housing 1 on the vacuum end thereof. Ball 5 is disposed within said tubular housing 1 and seated against said lip 4. Resilient annular elastic member 6 is positioned in an annular groove 7 formed in the inner wall of said housing 1 on the side of ball 5 opposite the side which engages restraining lip 4. Cap 8 is optional and vacuum grease or thermosetting plastic such as epoxy may be placed into space 9 as a redundant seal. Restraining lip 4 reduces the inner diameter of tubular housing 1 to the extent of 1 to 1.5% of the diameter of sphere 5. The restraining lip prevents ball 5 from being drawn into the vacuum space. The geometry of the device shown in FIG. 1 is such that the sphere 5 is "snapped" past the "dead center" of the elastomer ring 6 and into a position restricted from movement in one direction by the restraining lip 4 and in the other direction by the compressed elastomer 6. Sealing is accomplished by elastomer 6 as it is gas-tightly contacted on one side by ball 5 and on the other by groove 7 in tubular housing 1. Elastomer compression and therefore reliability of the seal depends solely on the geometry of the sealing device and is independent of atmospheric pressure. In addition, because the restraining lip of the assembly in FIG. 1 only slightly restricts the innner opening of tubular housing 1, resistance of the device to gas passage during evacuation is extremely low compared to the heretofore described prior art evacuation spud.

Figure 2:
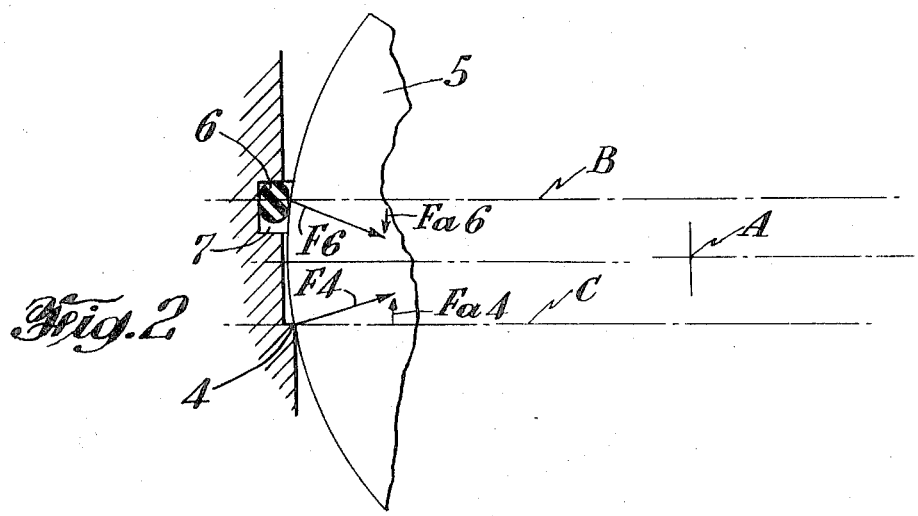
FIG. 2 is an enlarged cross sectional view of the seal portion of FIG. 1.

FIG. 2 shows in greater detail the relationship between ball 5, elastomer 6, and restraining lip 4. As can be seen the center line of ball 5 passes through ball center A and lies between the elastic seal circle B, ("dead center" of elastomer) and restraining lip seat circle C.

In addition, it can be seen that the rigid closure member, ball 5, has a shape and size such that its maximum outer periphery in a plane substantially perpendicular to the passage axis lies between the innner periphery of the resilient elastic member 6 when in an uncompressed state and the periphery of the housing inner wall, which rigid closure member, ball 5, is disposed against said restraining means, lip 4, which applies a restraining force F4 to the closure member, ball 5, having at leas an axial component Fa4 in the direction of the passage high pressure end, and which closure member, member 5, compressively and gas-tightly contacts said elastic member 6, and said elastic member applies a force F6 to the closure member having an axial component Fa6 equal to an in a direction opposite that of said restraining force component Fa4.

Figure 3:
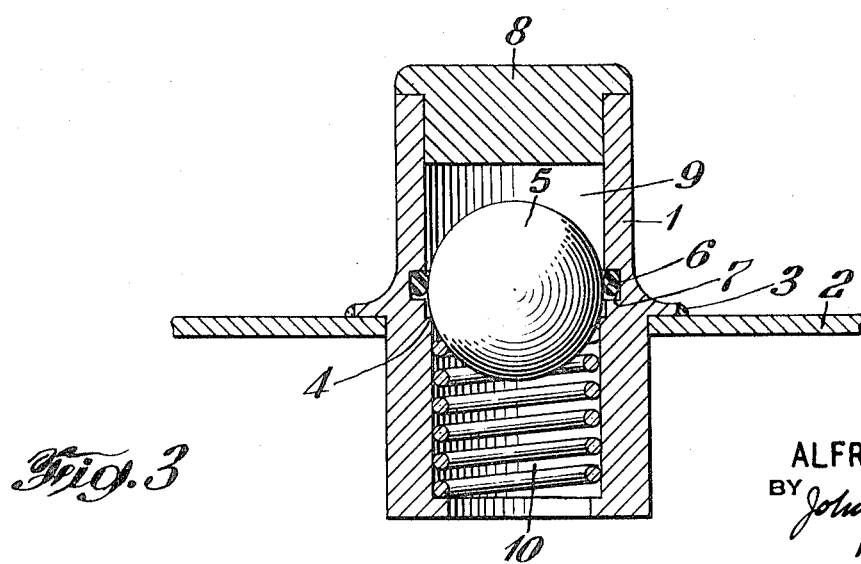
FIG. 3 is a cross sectional view of the FIG. 1 embodiment with a subatmospheric pressure release feature added thereto.

If the closure device of FIG. 1 is to be used as a vacuum seal and also as a low pressure release device (a safety feature for possible vacuum deterioration to more than atmospheric pressure), then the space identified as space 9 in FIG. 1 can be filled with an adequate vacuum grease and the device closed with a non gastight cap. If the gastight assembly of this invention is to be used as a vacuum seal and also as a subatmospheric pressure release device, the ball 5 may be loaded with a spring 10, as shown in FIG. 3, on the vacuum side thereof which spring will dislodge the closure member, ball 5, when pressure on the vacuum side reaches a predetermined subatmospheric level. The reliability with which release pressure can be predetermined is dependent upon the retention of elastic properties of elastomer 6 and also on the deterioration rate of vacuum grease 9, inasmuch as properties of these two components may vary with time. For this reason a fluorosilicon elastomer is preferred. It is also preferred that closure member 5 be made of stainless steel. As discussed heretofore tubular member 1 should be made of a metal which is compatible in welding with that of the double-walled container outer metallic wall. It may be of interest to note that the effect of vibration on the closure device of this invention is to more rigidly seal ball 5 against restraining lip 4, thereby improving the vacuum tightness of the seal made by elastomer 6.

To ensure that seals formed in gastight seal assemblies of this invention are long lasting, it is necessary that they do not only resist deformation by stretching, that is, possess elasticity, but also that they have the capacity to recover their shape and do not "take a set," that is, possess resilience. Some preferred elastomers are nitrile, buna N rubber (NRB), buna S rubber (SBR or GRS), butadiene rubber (BR), butyl rubber (IIR), chloroprene rubber (CR), and fluorosilicone elastomer.

What is claimed is:

1. A gas-tight seal assembly comprising a rigid housing with an inner wall forming a passage therethrough, one end of the passage communicating with an environment of high pressure and the other end of said passage communicating with an environment of low pressure; a rigid restraining means disposed within said passage intermediate said one end and said other end; a groove in the housing inner wall disposed between said restraining means and the passage one end; a resilient, elastic member positioned in said groove and of sufficient size for its entire inner periphery to extend inwardly beyond the housing inner wall into the passage when in an uncompressed state; a rigid closure member having a shape and size such that its maximum outer periphery in a plane substantially perpendicular to the passage axis lies between the inner periphery of the resilient elastic member in an uncompressed state and the periphery of the housing inner wall between said restraining means and said one end; and arranged and constructed with said restraining means applying a restraining force to the closure member having at least an axial force component in the direction of said passage one end, and said closure member compressively and gas-tightly contacting said elastic member with said elastic member applying a force to the closure member having at least an axial force component equal to and in a direction opposite that of said axial force component of restraining force.

2. A gas-tight seal assembly as described in claim 1 wherein the rigid housing comprises a rigid tube having a restaining lip annularly disposed therein which lip comprises said rigid restraining means, a rigid ball, comprising said rigid closure member, disposed within said tube and seated against said lip, a resilient, elastic annular member positioned in an annular groove formed in the inner wall of said tube between said restraining member and the passage one end such that when said ball seats against said restraining lip, said annular elastic member compressively contacts both said ball and said groove forming a gastight seal.

3. A seal assembly as described in claim 1 wherein said rigid closure member is biased, as with a spring type bias means, on said passage other end side of said rigid closure member whereby the rigid closure member is dislodged from the rigid restraining means and the gas-tight seal is broken when the forces applied to the closure member by the compressed elastic member and environment pressure from said passage one end are exceeded by the forces applied to the closure member by the bias means and environment pressure from said passage other end.

4. A seal assembly as described in claim 1 wherein a cap is applied to said passage one end.

5. A gas-tight seal assembly as described in claim 2 wherein the center line of said rigid ball lies between said elastic annular member and said restraining lip.

* * * * *